(12) United States Patent
Lin et al.

(10) Patent No.: US 10,636,530 B2
(45) Date of Patent: Apr. 28, 2020

(54) FLOW DISTRIBUTION DEVICE, LOWER INTERNALS OF REACTOR AND REACTOR

(71) Applicants: STATE NUCLEAR POWER TECHNOLOGY CORPORATION LTD., Beijing (CN); SHANGHAI NUCLEAR ENGINEERING RESEARCH & DESIGN INSTITUTE, Shanghai (CN)

(72) Inventors: Shaoxuan Lin, Shanghai (CN); Yejia Liang, Shanghai (CN); Zonghua Ding, Shanghai (CN); Ming Zhang, Shanghai (CN); Qing Yu, Shanghai (CN); Wei Zhang, Shanghai (CN); Weida Yao, Shanghai (CN); Fan Yu, Shanghai (CN)

(73) Assignees: STATE NUCLEAR POWER TECHNOLOGY CORPORATION LTD., Beijing (CN); SHANGHAI NUCLEAR ENGINEERING RESEARCH & DESIGN INSTITUTE, Shanghai (CN)

( * ) Notice: Subject to any disclaimer, the term of this patent is extended or adjusted under 35 U.S.C. 154(b) by 1214 days.

(21) Appl. No.: 14/759,735

(22) PCT Filed: Jan. 8, 2014

(86) PCT No.: PCT/CN2014/070323
§ 371 (c)(1),
(2) Date: Jul. 8, 2015

(87) PCT Pub. No.: WO2014/108072
PCT Pub. Date: Jul. 17, 2014

(65) Prior Publication Data
US 2015/0357059 A1 Dec. 10, 2015

(30) Foreign Application Priority Data
Jan. 8, 2013 (CN) .......................... 2013 1 0005584

(51) Int. Cl.
*G21C 13/02* (2006.01)
*G21C 3/322* (2006.01)
(Continued)

(52) U.S. Cl.
CPC .............. *G21C 13/02* (2013.01); *G21C 1/086* (2013.01); *G21C 3/322* (2013.01); *G21C 3/3305* (2013.01); *G21C 5/10* (2013.01); *Y02E 30/40* (2013.01)

(58) Field of Classification Search
CPC .......... G21C 13/02; G21C 5/10; G21C 15/00; G21C 7/32; G21C 1/086; G21C 3/3305
(Continued)

(56) References Cited

U.S. PATENT DOCUMENTS

| 4,960,561 A | * | 10/1990 | Gerard | G21C 17/108 376/352 |
| 2009/0052606 A1 | * | 2/2009 | Gilmore | G21C 13/024 376/347 |

FOREIGN PATENT DOCUMENTS

| CN | 101606204 A | 12/2009 | |
| CN | 102800371 A | * 11/2012 | Y02E 30/40 |

(Continued)

OTHER PUBLICATIONS

Machine Translation of CN 102800371.*
PCT/CN2014/070323 English Translation of the International Search Report dated Mar. 27, 2014, 3 pages.

*Primary Examiner* — Sharon M Davis
(74) *Attorney, Agent, or Firm* — Lathrop GPM LLP

(57) ABSTRACT

A flow distribution device (3) for a reactor, a lower internals (100) of a reactor and a reactor are provided. The lower internals (100) includes: a lower core support plate (2) defining a coolant hole therethrough; a flow distribution device (3) mounted on the lower core support plate (2) and including a distribution annular plate (8) and a distribution (Continued)

bottom plate (9); a vortex suppression plate (7) disposed below the distribution bottom plate (9); a support column (4) defining an upper end connected with the lower core support plate (2) and a lower end passing through the distribution bottom plate (9) to connect with the vortex suppression plate (7); an energy absorption device (5) defining an upper end connected with the vortex suppression plate (7); and an anti-break bottom plate (6) disposed on the lower end of the energy absorption device (5).

15 Claims, 4 Drawing Sheets

(51) Int. Cl.
    *G21C 3/33*     (2006.01)
    *G21C 5/10*     (2006.01)
    *G21C 1/08*     (2006.01)

(58) Field of Classification Search
    USPC .......................................................... 376/399
    See application file for complete search history.

(56) References Cited

FOREIGN PATENT DOCUMENTS

| | | | |
|---|---|---|---|
| CN | 102800371 A | 11/2012 | |
| CN | 202650566 U | 1/2013 | |
| CN | 103177782 A | 6/2013 | |
| CN | 203026178 U | 6/2013 | |
| JP | 2002-257971 A | 9/2002 | |
| WO | WO-2008100764 A1 * | 8/2008 | ............. G21C 1/086 |

\* cited by examiner

US 10,636,530 B2

FLOW DISTRIBUTION DEVICE, LOWER INTERNALS OF REACTOR AND REACTOR

RELATED APPLICATIONS

This U.S. application claims priority under 35 U.S.C. 371 to, and is a U.S. National Phase application of, the International Patent Application No. PCT/CN2014/070323, filed on Jan. 8, 2014, which claims the benefit of prior Chinese Application No. 201310005584.7 filed on Jan. 8, 2013. The entire contents of the before-mentioned patent applications are incorporated by reference as part of the disclosure of this U.S. application.

FIELD

The present invention generally relates to the field of pressurized water reactor, and more particularly, to a flow distribution device, a lower internals having the flow distribution device and a reactor having the lower internals.

BACKGROUND

A reactor such as a pressurized water reactor includes a pressure vessel, an upper internals, a lower internals and a nuclear fuel assembly. The heat generated by a reactor core in the pressure vessel is absorbed by the coolant, thus cooling the core. A temperature of the coolant which has absorbed the heat is increased, the coolant with a high temperature is pumped into a steam generator through a primary piping by a reactor coolant pump so as to exchange heat with a secondary circuit of the reactor, and the coolant with a reduced temperature re-enters the core.

In order to cool the nuclear fuel assembly of the core, before entering into the core, the coolant needs to be uniform. Therefore, a flow distribution device is usually disposed below the lower internals in the pressure vessel. In the related art, the flow distribution device generally is formed by an orifice plate. When a volume of a lower chamber of the pressure vessel is reduced, such flow distribution device has a poor distribution effect, which results in a poor uniformity of the coolant and reduces the cooling performance. Moreover, the orifice plate tends to deform due to an impact of the coolant, thus reducing the coolant distribution effect.

Accordingly, a flow distribution device configured as a flow skirt is proposed in the related art, and the flow skirt has a plurality of through holes and is welded on an inner wall of the pressure vessel. After entering into the pressure vessel, the coolant flows downwards through an annular channel between the pressure vessel and a core barrel, and is contacted with the flow skirt in a lower portion of the annular channel, thus the coolant is forced to flow through the holes in the flow skirt, in which a part of the coolant flows upwards through a lower core support plate into the core, and another part of the coolant flows downwards first, then flows upwards through a vortex suppression plate, finally flows through the lower core support plate into the core. However, since the flow skirt is directly welded on the pressure vessel, it is difficult and complex to replace and maintain the flow skirt. Moreover, since an expansion coefficient of the flow skirt is different from that of the pressure vessel, the flow skirt may be damaged. In addition, since the annular channel between the flow skirt and the pressure vessel is narrowed gradually in a direction from top to bottom and the coolant may be blocked by the flow skirt. A flow resistance to the coolant is increased and a pressure drop in the loop and a flowing of the coolant are disadvantageously influenced, thus reducing the coolant distribution effect. Furthermore, the flow skirt tends to be deformed under a lateral pressure of the coolant, thus the distribution effect and a working life of the flow skirt are reduced.

A hemispheric flow distribution plate is further proposed in the related art, a narrow and long passage is formed between the hemispheric flow distribution plate and an inner bottom surface of the pressure vessel. The coolant flows from the narrow and long passage towards the lower core support plate through the through holes in the flow distribution plate. Since the narrow and long passage is formed between the flow distribution plate and the bottom of the pressure vessel, a vortex of the coolant tends to be generated in the narrow passage, and it is impossible to dispose other parts such as the lower internals in the narrow and long passage, thus reducing the distribution effect. Moreover, the flow distribution plate tends to be deformed under the pressure of the coolant, thus influencing the distribution effect.

SUMMARY

The present invention seeks to solve at least one of the problems existing in the related art to at least some extent.

Accordingly, a first object of the present invention is to provide a lower internals of a reactor, in which a flow distribution device thereof has a simple structure and can distribute coolant uniformly, a resistance of the flow distribution device to the coolant is small, and the flow distribution device is easy to maintain and replace.

A second object of the present invention is to provide a flow distribution device for a reactor, the flow distribution device has a simple structure, is convenient to maintain and replace, and has an improved distribution effect.

A third object of the present invention is to provide a reactor having the above lower internals.

Embodiments of a first aspect of the present invention provide a lower internals of a reactor, including: a lower core support plate defining a coolant hole therethrough; a flow distribution device mounted on the lower core support plate and comprising a distribution annular plate and a distribution bottom plate disposed at a lower end of the distribution annular plate, the distribution annular plate and the distribution bottom plate defining a distribution hole therethrough respectively; a vortex suppression plate disposed below the distribution bottom plate; a support column defining an upper end connected with the lower core support plate and a lower end passing through the distribution bottom plate to connect with the vortex suppression plate; an energy absorption device defining an upper end connected with the vortex suppression plate and a lower end; and an anti-break bottom plate disposed on the lower end of the energy absorption device.

With the lower internals according to embodiments of the present invention, by disposing the basin-shaped flow distribution device including the distribution annular plate and the distribution bottom plate, a distribution of the coolant is uniform and a resistance to the coolant is reduced.

Since the flow distribution device is mounted on the lower core support plate, comparing with the flow distribution device welded on an inner wall of a pressure vessel of the reactor in the related art, the flow distribution device is easy to dismount, mount and maintain without an underwater cutting and an underwater welding in the pressure vessel.

Furthermore, since the distribution holes are formed in both the distribution annular plate and the distribution bottom plate, a total area of the distribution holes in the flow distribution device is increased, thus the flow distribution of the coolant is more uniform and a pressure loss is reduced.

In some embodiment, the distribution annular plate is connected with a bottom surface of the lower core support plate and an upper end surface of the distribution annular plate is contacted with the bottom surface of the lower core support plate.

In some embodiment, a reinforcing column is disposed on an upper surface of the distribution bottom plate and defines an upper end surface in flush with the upper end surface of the distribution annular plate. By disposing the reinforcing column on the upper surface of the distribution bottom plate, a rigidity of the flow distribution device is improved and a deformation of the flow distribution device due to an impact of the coolant is reduced, thus improving the distribution effect.

In some embodiments, a first threaded hole is formed in the lower core support plate and an axial through hole is formed within the reinforcing column, in which the reinforcing column is fastened on the lower core support plate by a first threaded connection piece passing through the axial through hole and threadedly fitted in the first threaded hole. By fastening the reinforcing column on the lower core support plate by the first threaded connection piece, the deformation of the flow distribution device due to the impact of the coolant is further reduced, a connection strength between the flow distribution device and the lower core support plate is enhanced and it is convenient to mount the flow distribution device.

In some embodiment, the axial through hole comprises an upper hole segment and a lower hole segment having a radial dimension larger than that of the upper hole segment, in which the first threaded connection piece is configured as a bolt and a head of the bolt is accommodated in the lower hole segment. By accommodating the head of the bolt in the lower hole segment, the bolt is avoided to expose from the lower hole segment, thus avoiding a disadvantageous influence of the bolt on the flow of the coolant.

In some embodiments, a plurality of reinforcing columns are provided and evenly distributed in a same circumference centered on a center of the distribution bottom plate.

In some embodiments, the reinforcing column and the distribution bottom plate are formed integrally, and the reinforcing column comprises a lower column segment having a circular cross-section and an upper column segment having a cross-shaped cross-section.

In some embodiments, a second threaded hole is formed in the lower core support plate, and a plurality of protrusions are formed on an inner surface of the distribution annular plate integrally and distributed uniformly in a circumferential direction of the distribution annular plate, in which an upper surface of the protrusion is in flush with the upper end surface of the distribution annular plate, in which a connection through hole is formed in each protrusion, and each protrusion is fastened to the lower core support plate by a second threaded connection piece passing through the connection through hole and threadedly fitted in the second threaded hole.

By disposing the protrusion, the rigidity of the flow distribution device can be further improved, the deformation of the flow distribution device due to the impact of the coolant is reduced and the distribution effect is improved. Moreover, with the second threaded connection piece passing through the connection through hole and threadedly fitted into the second threaded hole, it is convenient to mount the flow distribution device on the lower core support plate, thus the connection strength therebetween is enhanced.

In some embodiments, the connection through hole includes an upper hole segment and a lower hole segment having a radial dimension larger than that of the upper hole segment, in which the second threaded connection piece is configured as a bolt and a head of the bolt is accommodated in the lower hole segment. By accommodating the head of the bolt in the lower hole segment, the bolt is avoided to expose from the lower hole segment, thus avoiding a disadvantageous influence of the bolt on the flow of the coolant.

In some embodiments, a radial dimension of the distribution annular plate is increased gradually in a direction from the lower end of the distribution annular plate to an upper end of the distribution annular plate.

In some embodiments, the distribution annular plate and the distribution bottom plate are formed integrally. The distribution bottom plate and the distribution annular plate may be formed integrally by forging, or the distribution bottom plate and the distribution annular plate may be manufactured independently and welded together.

In some embodiments, the upper end surface of the distribution annular plate is welded with the bottom surface of the lower core support plate.

In some embodiments, a diameter of the distribution hole in the distribution annular plate is smaller than that of the distribution hole in the distribution bottom plate.

In some embodiments, the distribution bottom plate is configured to have a round shape, the distribution annular plate is configured to have an annular shape, wherein a center of the distribution bottom plate is coincided with that of the distribution annular plate, wherein a plurality of the distribution holes are provided in the distribution annular plate and distributed symmetrically with respect to the center of the distribution annular plate, wherein a plurality of the distribution holes are provided in the distribution bottom plate and distributed symmetrically with respect to the center of the distribution bottom plate.

In some embodiments, a plurality of coolant holes are provided in the lower core support plate, and each of the plurality of distribution holes in the distribution bottom plate is corresponding to a portion of the plurality of coolant holes.

In some embodiments, a through hole is formed in the distribution bottom plate, and the upper end of the support column is passed through the through hole in the distribution bottom plate to connect with the lower core support plate, in which an annular gap is defined between the support column and an inner surface of the through hole. Therefore, the coolant may flow towards the lower core support plate via the annular gap, thus reducing the influence on the coolant flowing.

Embodiments of a second aspect of the present invention provide a lower internals of a reactor, including: a lower core support plate disposed on a bottom of a reactor core of the reactor and defining a coolant hole therethrough; a flow distribution device disposed on a bottom of the lower core support plate and defining a plurality of distribution holes therethrough; a plurality of support columns passing through the flow distribution device to be fixed to the bottom of the lower core support plate and defining a lower end; a vortex suppression plate disposed horizontally and fixed to the lower ends of the plurality of support columns; a plurality of energy absorption devices mounted and fixed at a lower portion of the vortex suppression plate; and an anti-break bottom plate mounted and fixed at lower portions of the plurality of energy absorption devices.

In some embodiments, the flow distribution device includes: a distribution annular plate; a distribution bottom plate fixed to a lower end of the distribution annular plate; and a reinforcing column fixed on an upper surface of the distribution bottom plate, wherein the distribution annular plate and the distribution bottom plate are formed integrally by forging or welding a forged ring with a plate, wherein an upper end surface of the distribution annular plate is in flush with an upper end surface of the reinforcing column.

In some embodiments, an included angel formed between the distribution annular plate and the distribution bottom plate is matched with a contour of an inner surface of a lower end cover of the pressure vessel.

In some embodiments, a plurality of protrusions are formed on the distribution annular plate and a counter bore for a penetration of a threaded connection piece is formed within each of the plurality of protrusions.

In some embodiments, the plurality of distribution holes having same diameters are formed in a circumferential wall of the distribution annular plate and distributed symmetrically with respect to a center of the distribution annular plate.

In some embodiments, the plurality of distribution holes with same diameters are formed in the distribution bottom plate and distributed symmetrically with respect to a center of the distribution bottom plate, in which each distribution hole in the distribution bottom plate is corresponding to four coolant holes in the lower core support plate.

In some embodiments, a plurality of through holes are formed in a position of the distribution bottom plate at which the support column is passed, in which a diameter of the through hole is larger than that of a flange at a lower end of the support column, and the support column is passed through the through hole to fix to the lower core support plate, and an annular flow gap is defined between the through hole and the support column.

Embodiments of a third aspect of the present invention provide a flow distribution device for a reactor, including: a distribution annular plate and a distribution bottom plate disposed at a lower end of the distribution annular plate, each of the distribution annular plate and the distribution bottom plate defining a distribution hole.

With the flow distribution device according to embodiments of the present invention, by disposing the basin-shaped flow distribution device including the distribution annular plate and the distribution bottom plate, a flow distribution of the coolant is uniform and a resistance to the coolant is reduced.

In some embodiments, a reinforcing column is disposed on an upper surface of the distribution bottom plate and defines an upper end surface in flush with an upper end surface of the distribution annular plate.

In some embodiments, an axial through hole is formed within the reinforcing column, and the axial through hole comprises an upper hole segment and a lower hole segment having a radial dimension larger than that of the upper hole segment.

In some embodiments, a plurality of reinforcing columns are provided and distributed in a same circumference centered on a center of the distribution bottom plate.

In some embodiments, the reinforcing column and the distribution bottom plate are formed integrally, and the reinforcing column comprises a lower column segment having a circular cross-section and an upper column segment having a cross-shaped cross-section.

In some embodiments, a plurality of protrusions are integrally formed on an inner surface of the distribution annular plate and distributed uniformly in a circumferential direction of the distribution annular plate, wherein an upper surface of the protrusion is in flush with the upper end surface of the distribution annular plate, wherein a connection through hole is formed in each protrusion, and each connection through hole comprises an upper hole segment and a lower hole segment having a radial dimension larger than that of the upper hole segment.

In some embodiments, a radial dimension of the distribution annular plate is increased gradually in a direction from the lower end of the distribution annular plate to an upper end of the distribution annular plate.

In some embodiments, the distribution annular plate and the distribution bottom plate are formed integrally by forging or welding.

In some embodiments, a diameter of the distribution hole in the distribution annular plate is smaller than that of the distribution hole in the distribution bottom plate.

In some embodiments, the distribution bottom plate is configured to have a round shape, the distribution annular plate is configured to have an annular shape, wherein a center of the distribution bottom plate is coincided with a center of the distribution annular plate, and a plurality of distribution holes are provided in the distribution annular plate and distributed symmetrically with respect to a center of the distribution annular plate, wherein a plurality of distribution holes are provided in the distribution bottom plate and distributed symmetrically with respect to a center of the distribution bottom plate.

In some embodiments, a through hole is formed in the distribution bottom plate.

Embodiments of a fourth aspect of the present invention provide a reactor, including: a pressure vessel; a lower internals disposed in the pressure vessel according to embodiments of the first and second aspects of the present invention, in which an annular flow channel is defined between a distribution annular plate and an inner surface of the pressure vessel.

With the reactor according to embodiments of the present invention, the flow distribution of the coolant is uniform, the cooling effect is good and it is convenient to mount, dismount and replace the flow distribution device without the underwater welding and relative operations in the pressure vessel.

In some embodiments, the pressure vessel includes a vessel body and a lower end cover connected with a lower end of the vessel body, the distribution annular plate is positioned in the lower end cover, a contour of an outer surface of the distribution annular plate is matched with that of a part of an inner surface of the lower end cover corresponding to the outer surface of the distribution annular plate.

BRIEF DESCRIPTION OF THE DRAWINGS

These and other aspects and advantages of embodiments of the present invention will become apparent and more readily appreciated from the following descriptions made with reference to the accompanying drawings, in which.

Figure 1:
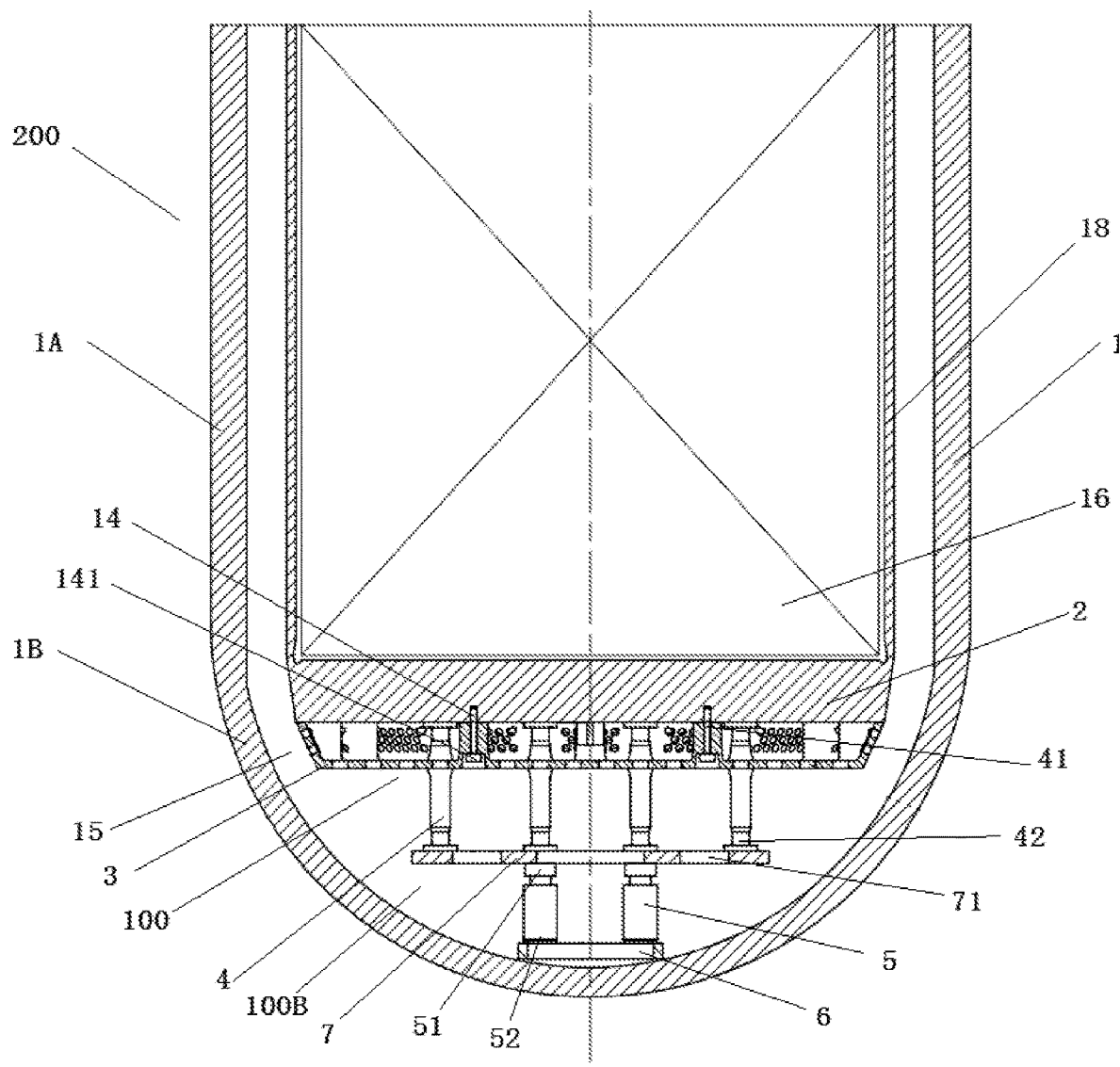
FIG. 1 is a partially schematic view of a reactor according to an embodiment of the present invention, in which a lower internals according to an embodiment of the present invention is received in a pressure vessel of the reactor.

REFERENCE NUMERALS lower internals 100, reactor 200; pressure vessel 1, vessel body 1A, lower end cover 1B, annular chamber (downcomer) 100A, lower chamber (plenum) 100B, lower core support plate 2, coolant hole 21, first threaded hole 22, second threaded hole 24; bottom surface of lower core support plate 23; flow distribution device 3, support column 4, upper end of support column 41, lower end of support column 42, energy absorption device 5, upper end of energy absorption device 51, lower end of energy absorption device 52, anti-break bottom plate 6, vortex suppression plate 7, vortex suppression plate hole 71, distribution annular plate 8, distribution bottom plate 9, reinforcing column 10, axial through hole 101, upper hole segment 1010, lower hole segment 1011, upper column segment 10A, lower column segment 10B, protrusion 11, distribution hole 12, through hole 13, first threaded connection piece 14, head of first threaded connection piece 141, second threaded connection piece 17; head of second threaded connection piece 171, connection through hole 110, upper hole segment 110A, lower hole segment 110B, annular flow channel 15, core 16; core barrel 18.

DETAILED DESCRIPTION

Reference will be made in detail to embodiments of the present invention. Embodiments of the present invention will be shown in drawings, in which the same or similar elements and the elements having same or similar functions are denoted by like reference numerals throughout the descriptions. The embodiments described herein according to drawings are explanatory and illustrative, not construed to limit the present invention.

A reactor 200 according to embodiments of the present invention will be described in the following with reference to drawings.

As shown in FIG. 1, the reactor 200 according to embodiments of the present invention includes a pressure vessel 1 and a lower internals 100. The lower internals 100 is disposed within the pressure vessel 1. The pressure vessel 1 defines a lower chamber (or plenum) 100B in a lower portion of an inner chamber of the pressure vessel 1. Specially, the lower internals 100 is disposed within a lower portion of the pressure vessel 1.

In an embodiment of the present invention as shown in FIG. 1, the pressure vessel 1 includes a annular vessel body 1A and a lower end cover 1B. The lower end cover 1B is connected with a lower end of the vessel body 1A so as to close the lower end of the vessel body 1A. The lower internals 100 is disposed within the lower end cover 1B and the lower chamber 100B is defined in a lower portion of the lower end cover 1B. Those having ordinary skills in the art in the art will appreciate that the present vessel 1 includes an upper end cover (not shown) connected with an upper end of the vessel body 1A and configured to close the upper end of the vessel body 1A.

Those having ordinary skill in the art will appreciate that, other components of the reactor 200 are received in the pressure vessel 1, such as an upper internals (not shown). A reactor core 16 is located within the pressure vessel 1 and an annular chamber (or downcomer) 100A is formed between a core barrel 18 outside of the core 16 and the pressure vessel 1. An inlet pipe (not shown) and an outlet pipe (not shown) communicated with the annular chamber 100A are disposed at the vessel body 1A of the pressure vessel 1, and a coolant enters the annular chamber 100A through the inlet pipe and flows out of the annular chamber 100A through the outlet pipe.

A lower internals 100 of a reactor according to embodiments of the present invention will be described in the following with reference to FIGS. 1-7.

A lower internals 100 according to embodiments of the present invention is accommodated in a pressure vessel 1. The lower internals 100 includes a lower core support plate 2, a flow distribution device 3, a vortex suppression plate 7, a support column 4, an anti-break bottom plate 6 and an energy absorption device 5. A core 16 is supported on the lower core support plate 2 and a core barrel 18 is connected with the lower core support plate 2, for example, the core barrel 18 is welded with the lower core support plate 2.

Figures 2, 3:
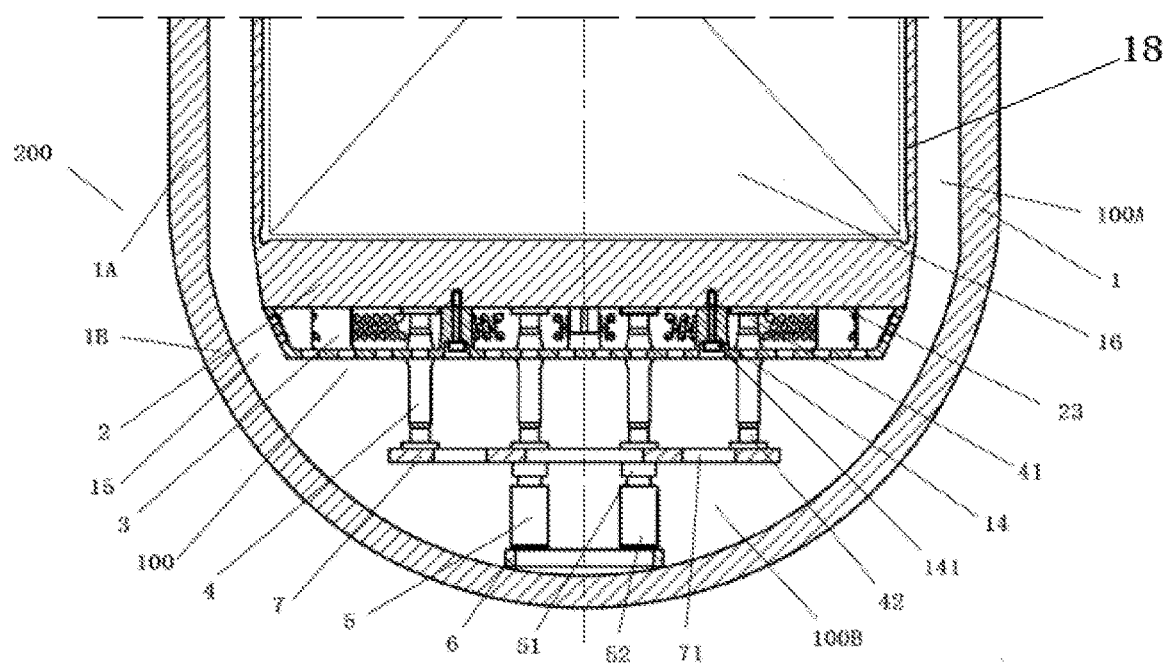
FIG. 2 is a partially enlarged view of FIG. 1.
FIG. 3 is a schematic view of a flow distribution device according to an embodiment of the present invention.
Figure 4:
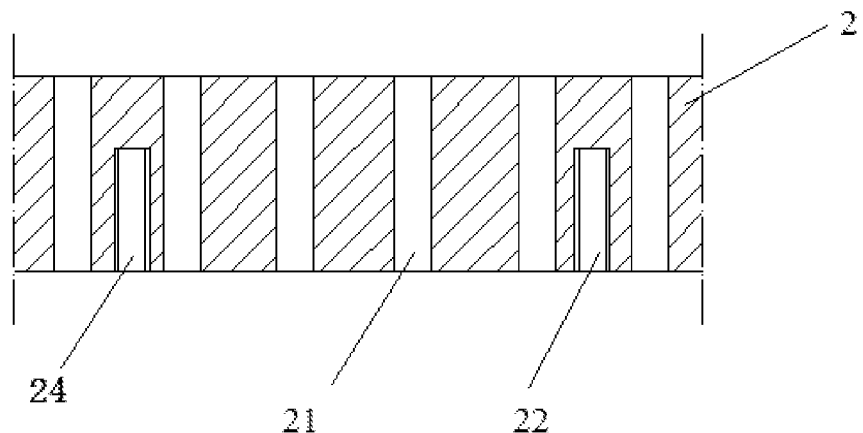
FIG. 4 is a partially sectional view of a lower core support plate of a lower internals according to an embodiment of the present invention.

As shown in FIG. 4, the lower core support plate 2 has a coolant hole 21 therethrough, and the coolant in the lower chamber 100B enters the core 16 through the coolant hole 21 so as to cool the core 16. As shown in FIGS. 1 and 2, the flow distribution device 3 is disposed on the lower core support plate 2 and located under the lower core support plate 2. In some embodiments, the flow distribution device 3 is mounted on a bottom surface of the lower core support plate 2.

As shown in FIG. 3, the flow distribution device 3 according to embodiments of the present invention includes a distribution annular plate 8 and a distribution bottom plate 9. The distribution bottom plate 9 is disposed on a lower end of the distribution annular plate 8 so as to close the lower end of the distribution annular plate 8. Each of the distribution annular plate 8 and the distribution bottom plate 9 has a distribution hole 12 formed therethrough.

As shown in FIG. 3, the distribution annular plate 8 and the distribution bottom plate 9 may constitute the substantially basin-shaped flow distribution device 3. The distribution annular plate 8 is disposed on the bottom surface of the lower core support plate 2 so as to fix the flow distribution device 3 on the bottom surface of the lower core support plate 2. The distribution annular plate 8 may be welded on the bottom surface of the lower core support plate 2, or mounted on the lower core support plate 2 by a bolt, or fixed on the lower core support plate 2 by both of welding and bolting. In some embodiments, the distribution annular plate 8 is connected to the bottom surface of the lower core support plate 2 by the bolt, thus it is convenient to dismount and replace the flow distribution device 3. An annular flow channel 15 is formed between the distribution annular plate 8 and an inner wall of the lower end cover 1B. As shown in FIG. 1 and FIG. 2, an upper end surface of the distribution annular plate 8 abuts against the bottom surface of the lower core support plate 2, i.e., the upper end surface of the distribution annular plate 8 is closely contacted with the bottom surface of the lower core support plate 2.

The vortex suppression plate 7 is horizontally disposed below the distribution bottom plate 9 and has a vortex suppression plate hole 71 therethrough. The support column 4 has an upper end 41 connected with the lower core support plate 2 and a lower end 42 passing through the distribution bottom plate 9 so as to connect with the vortex suppression plate 7. The anti-break bottom plate 6 is disposed within the pressure vessel 1 and located below the vortex suppression plate 7. The energy absorption device 5 is disposed between the anti-break bottom plate 6 and the vortex suppression plate 7. Specifically, the energy absorption device 5 has an upper end connected with the vortex suppression plate 7 and a lower end on which the anti-break bottom plate 6 is disposed.

With the lower internals 100 according to embodiments of the present invention, the coolant enters the annular chamber 100A through the inlet pipe of the pressure vessel 1, and flows into the annular flow channel 15 formed between the distribution annular plate 8 and the inner wall of the lower end cover 1B from a lower portion of the annular chamber 100A. A small part of the coolant flows into an inner chamber (i.e., a chamber defined by the distribution annular plate 8 and the distribution bottom plate 9) of the flow distribution device 3 through the distribution holes 12 in the distribution annular plate 8, then flows into the core 16 from the inner chamber of the flow distribution device 3 through the coolant holes 21 in the lower core support plate 2. The other part of the coolant flows into the lower chamber 100B through the annular flow channel 15, then turns upwards along an arc inner wall of the lower end cover 1B, and finally flows into the inner chamber of the flow distribution device 3 through the distribution holes 12 (such as round holes) of the distribution bottom plate 9. The coolant is mixed to a certain extent and re-distributed in the flow distribution device 3, then the re-distributed coolant uniformly enters the core 16 through the coolant holes 21 in the lower core support plate 2 so as to cool the core 16. In the lower chamber 100B, the vortex suppression plate 7 is to prevent the coolant from generating a vortex in the lower chamber 100B, thus further improving a uniformity of the distribution of the coolant.

With the lower internals 100 according to embodiments of the present invention, since the flow distribution device 3 has the basin shape, the distribution of the coolant is uniform and a resistance to the coolant is reduced. Moreover, since the flow distribution device 3 is disposed on the lower core support plate 2, comparing with the flow distribution device welded on the inner wall of a pressure vessel 1 in the prior art, the flow distribution device is easy to dismount, mount and maintain without an underwater cutting and an underwater welding in the pressure vessel.

Furthermore, since the distribution holes 12 are formed in both the distribution annular plate 8 and the distribution bottom plate 9 of the flow distribution device 3, a total area of the distribution holes 12 in the flow distribution device 3 is increased, thus the distribution of the coolant is more uniform and a pressure loss is reduced.

In some embodiments, as shown in FIG. 1, a contour of an outer surface of the distribution annular plate 8 is matched with that of a part of an inner surface of the lower end cover 1B corresponding to the outer surface of the distribution annular plate 8, i.e., in an up-down direction, a cross sectional area of the annular flow channel 15 between the outer surface of the distribution annular plate 8 and the inner surface of the lower end cover 1B is substantially constant without a sudden increase and decrease, such that the coolant flows more smoothly, which reduces a possibility of generating vortexes and improves the uniformity of the coolant distribution.

As shown in FIG. 3, in some embodiments, a reinforcing column 10 is disposed on an upper surface of the distribution bottom plate 9 and has an upper end surface in flush with the upper end surface of the distribution annular plate 8, such that the upper end surface of the reinforcing column 10 is closely contacted with the bottom surface of the lower core support plate 2. By disposing the reinforcing column 10, a rigidity of the flow distribution device 3 is improved and the flow distribution device 3 can withstand the impact of the coolant. In other words, the flow distribution device 3 is not easy to deform when the coolant flows through the flow distribution device 3, thus further improving the distribution effect.

Figure 5:
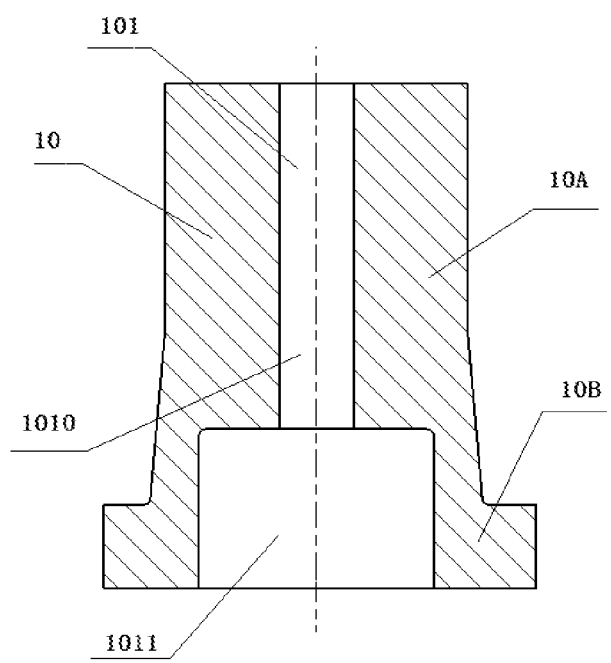
FIG. 5 is a sectional view of a reinforcing column of a flow distribution device according to an embodiment of the present invention.

As shown in FIG. 4, a first threaded hole 22 is formed in the lower core support plate 2. As shown in FIGS. 3 and 5, an axial through hole 101 is formed within the reinforcing column 10, and the reinforcing column 10 is fastened on the lower core support plate 2 by a first threaded connection piece 14 passing though the axial through hole 101 and threadedly fitted in the first threaded hole 22. In this way, the first threaded connection piece 14 fastens the reinforcing column 10 on the lower core support plate 2, thus the deformation of the flow distribution device due to the impact of the coolant is further reduced. The first threaded connection piece 14 may be configured to mount the flow distribution device 3 on the lower core support plate 2, so that it is convenient to mount and dismount the flow distribution device 3. Those having ordinary skill in the art will appreciate that, an outer edge of the upper end of the flow distribution plate 8 may be welded with the lower core support plate 2 additionally.

As shown in FIG. 5, the axial through hole 101 includes an upper hole segment 1010 and a lower hole segment 1011 having a radial dimension larger than that of the upper hole segment 1010. The first threaded connection piece 14 is configured as a bolt and a head of the bolt is accommodated in the lower hole segment 1011, rather than being extended out of the lower hole segment 1010, thus avoiding the influence of the bolt on the coolant flowing. In other words, the axial through hole 101 is configured as a counter bore. It may be understood that the upper hole segment 1010 may be a threaded hole or a non-threaded hole. As shown in FIG. 3, a plurality of reinforcing columns 10 are provided and evenly distributed in a same circumference centered on a center of the distribution bottom plate 9.

In some embodiments of the present invention, as shown in FIG. 3, the reinforcing column 10 and the distribution bottom plate 9 are formed integrally. In an embodiment of the present invention, the reinforcing column 10, the distribution bottom plate 9 and the distribution annular plate 8 are formed integrally. As shown in FIGS. 3 and 5, the reinforcing column 10 includes an upper column segment 10A and a lower column segment 10B. The lower column segment 10B is connected with the distribution bottom plate 9 and has a circular cross-section. The upper column segment is connected with an upper end of the lower column segment 10B and has a cross-shaped cross-section.

Figure 6:
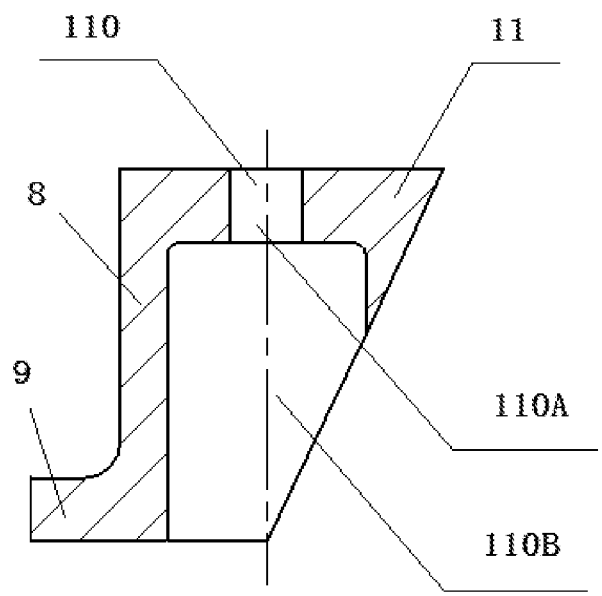
FIG. 6 is a sectional view of a protrusion of a flow distribution device according to an embodiment of the present invention.
Figure 7:
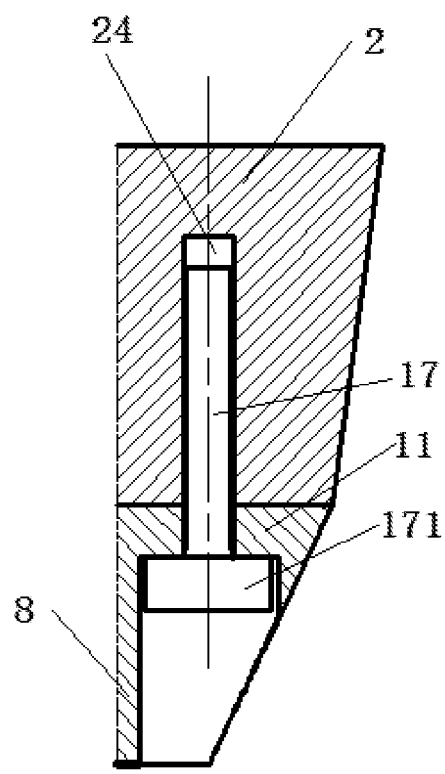
FIG. 7 is a schematic view showing a protrusion of a flow distribution device according to an embodiment of the present invention fastened to a lower core support plate by a second threaded connection piece.

In some embodiments of the invention, as shown in FIG. 4, a second threaded hole 24 is formed in the lower core support plate 2. As shown in FIG. 3, a plurality of protrusions 11 are integrally formed on an inner surface of the distribution annular plate 8 and uniformly distributed in a circumferential direction of the distribution annular plate 8. An upper surface of the protrusion 11 is in flush with the upper end surface of the distribution annular plate 8. As shown in FIGS. 6 and 7, a connection through hole 110 is formed in each protrusion 11, and each protrusion 11 is fastened to the lower core support plate 2 by a second threaded connection piece 17 passing through the connection through hole 110 and threadedly fitted in the second threaded hole 24.

By providing the protrusion 11, the rigidity of the flow distribution device 3 can be further improved, the deformation of the flow distribution device 3 due to the impact of the coolant is reduced and the distribution effect is improved. Moreover, with the second threaded connection piece 17 passing through the connection through hole 110 and threadedly fitted in the second threaded hole 24, it is convenient to mount the flow distribution device 3 on the lower core support plate 2, thus the connection strength thereof is enhanced. By way of example and without limitation, the second threaded connection piece 17 may be a bolt.

As shown in FIGS. 6 and 7, the connection through hole 110 includes an upper hole segment 110A and a lower hole segment 110B having a radial dimension larger than that of the upper hole segment 110A, i.e., the connection through hole 110 is configured as a counter bore. A head of the bolt 17 is accommodated in the lower hole segment 110B, rather than being extended out of the connection through hole 110, thus avoiding an disadvantageous influence of the bolt on the coolant flowing. Those of ordinary skill in the art will understand that the upper hole segment 110A may be a threaded hole or a non-threaded hole.

In some embodiments of the present invention, a radial dimension of the distribution annular plate 8 is increased gradually in a direction from the lower end of the distribution annular plate 8 to an upper end of the distribution annular plate 8.

In some embodiments, a diameter of the distribution hole 12 in the distribution annular plate 8 is smaller than that of the distribution hole 12 in the distribution bottom plate 9. Therefore, most of the coolant from the annular flow channel 15 enters into the lower chamber 100B and a small part of the coolant enters into the flow distribution device 3 through the distribution holes 12 in the distribution annular plate 8, thus further improving the uniformity of flow distribution. In an embodiment of the present invention, the distribution bottom plate 9 has a round shape, the distribution annular plate 8 has an annular shape, and the center of the distribution bottom plate 9 is coincided with a center of the distribution annular plate 8. A plurality of distribution holes 12 are provided in the distribution annular plate 8 and distributed symmetrically with respect to the center of the distribution annular plate 8 (i.e., central symmetry). A plurality of distribution holes 12 are provided in the distribution bottom plate 9 and distributed symmetrically with respect to the center of the distribution bottom plate 9. Therefore, the uniformity of distribution is improved.

In an embodiment of the present invention, a plurality of coolant holes 21 are provided in the lower core support plate 2, and each of the plurality of distribution holes 12 in the distribution bottom plate 9 may be corresponding to the plurality of coolant holes 21, such as four coolant holes 21. Herein, "corresponding to" may be interpreted in such a manner that a projection of each distribution hole 12 of the distribution bottom plate 9 on the lower core support plate 2 covers the plurality of coolant holes 21. A through hole 13 is formed in the distribution bottom plate 9, and the upper end of the support column 4 is passed through the through hole 13 in the distribution bottom plate 9 so as to connect with the lower core support plate 2. An annular gap is formed between an inner surface of the through hole 13 and the support column 4, thus the coolant may flow upwards through the annular gap and flow more smoothly.

A lower internals according to another embodiment of the present invention will be described in the following. As shown in FIG. 1, the lower internals 1 according to the embodiment of the present invention is accommodated within the pressure vessel 1 and includes a lower core support plate 2, a flow distribution device 3, a plurality of support columns 4, a plurality of energy absorption devices 5, an anti-break bottom plate 6 and a vortex suppression plate 7.

The lower core support plate 2 is fixed on a bottom of a core 16, a plurality of support columns 4 are fixed on a bottom of the lower core support plate 2, and the flow distribution device 3 having a plurality of distribution holes 12 (i.e., round holes) is coaxially fixed on the bottom of the lower core support plate 2. The lower core support plate 2 has a coolant hole 21 formed therethrough. The support column 4 is passed through the flow distribution device 3 so as to be fixed to the bottom of the lower core support plate 2 and has a lower end. The vortex suppression plate 7 is fixed to the lower ends of the plurality of support columns 4, the energy absorption device 5 is mounted and fixed at a lower portion of the vortex suppression plate 7, and the anti-break bottom plate 6 is mounted and fixed at lower portions of the plurality of energy absorption devices 5.

The flow distribution device 3 includes a distribution annular plate 8, a distribution bottom plate 9 fixed to a lower end of the distribution annular plate 8 in a circumferential direction thereof, and a reinforcing column 10 fixed on an upper surface of the distribution bottom plate 9. The distribution annular plate 8 and the distribution bottom plate 9 are formed integrally by forging or welding a forged ring with a plate. An upper end surface of the distribution annular plate 8 is in flush with an upper end surface of the reinforcing column 10.

An included angel formed between the distribution annular plate 8 and the distribution bottom plate 9 is matched with a contour of an inner surface of a lower end cover 1B of the pressure vessel 1, thus a smooth annular flow channel is formed between the distribution annular plate 8 and the pressure vessel 1, and a flow area of the annular flow channel does not have a sudden increase and decrease. A plurality of protrusions 11 are formed on the distribution annular plate 8 and a counter bore is formed within each of the plurality of protrusions 11, in which the counter bore is used for passing of a threaded connection piece to fix the distribution annular plate 8 on the lower core support plate 2.

The plurality of distribution holes 12 (such as small round holes) having same diameters are formed in a circumferential wall of the distribution annular plate 8 and distributed symmetrically with respect to a center of the distribution annular plate 8 (i.e., a central symmetry). Usually, the round hole is not formed in a position of the distribution annular plate 8 in which the protrusion 11 is disposed. The plurality of distribution holes 12 (such as small round holes) having same diameters are formed in the distribution bottom plate 9 and distributed symmetrically with respect to a center of the distribution bottom plate 9. Each small round hole 12 is corresponding to a plurality of coolant holes 21 in the lower core support plate 2. A plurality of through holes 13 (such as big round holes) are formed in a position of the distribution bottom plate 9 at which the support column 4 is penetrated. A diameter of the through hole 13 is larger than a diameter of a flange at a lower end of the support column 4, and the support column 4 is penetrated the through hole 13 so as to be fixed to the lower core support plate 2, thus an annular gap is formed between the through hole 13 and the support column 4.

After the flow distribution device 3 is manufactured and assembled, the flow distribution device 3 is connected with the lower surface of the lower core support plate 2 by a bolt or welding, and the energy absorption device 5 is disposed below the distribution device 3. Strength of the flow distribution device 3 is large enough to carry a weight of the lower internals 100, thus the lower internals 100 can be placed on a storage rack directly by using the lower surface of the flow distribution device 3 as a support surface.

A pressurized water reactor including the lower internals 100, an upper internals, a pressure vessel 1 and the core 16 is connected in a loop. The flow distribution device 3 is disposed in the lower internals 100, so that the coolant is uniform enough before entering the core 16.

With the lower internals 100 according to embodiments of the present invention, the coolant enters into an annular chamber 100A through an inlet pipe of the pressure vessel 1, then flows into the annular flow channel formed between an outer wall of the flow distribution device 3 and an inner wall of the pressure vessel 1 through the annular chamber 100A, and finally turns around along an arc inner wall of the lower end cover 1B. The coolant enters into the flow distribution device 3 through the small round holes 12 in the distribution annular plate 8 and the distribution bottom plate 9 and the annular gaps between the big round holes 13 and the support columns 4. The coolant in the flow distribution device 3 is mixed to a certain extent and re-distributed, and the re-distributed coolant enters into the core 16 uniformly. Since the protrusion 11 and the reinforcing column 10 are connected with the lower core support plate 2, the flow distribution device 3 has a great rigidity and can resist an impact of the coolant.

With the flow distribution device 3, the lower internals 100 and the rector 200 according to embodiments of the present invention, by changing size, number, shape and position of the coolant holes 21 of the flow distribution device 3, it is convenient adjust a distribution effect and a resistance loss along path of the coolant before the coolant enters the core 16, such that an allowable deviation value and a maximum average flow rate of the flow distribution can be satisfied.

In the specification, unless specified or limited otherwise, relative terms such as "central", "longitudinal", "lateral", "length", "width", "thickness", "up", "down", "front", "rear", "right", "left", "vertical", "horizontal", "top", "bottom", "inner", "outer", "clockwise", "anticlockwise", "axial", "radial", "circumferential" as well as derivative thereof should be construed to refer to the orientation as then described or as shown in the drawings under discussion for simplifying the description of the present invention, but do not alone indicate or imply that the device or element referred to must have a particular orientation. Moreover, it is not required that the present invention is constructed or operated in a particular orientation. Therefore, these terms shall not be interpreted as limitations of the present invention. In addition, terms such as "first" and "second" are used herein for purposes of description and are not intended to indicate or imply relative importance or significance. Thus, features limited by "first" and "second" are intended to indicate or imply including one or more than one these features. In the description of the present invention, "a plurality of" relates to two or more than two.

In the description of the present invention, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interaction between two elements. These having ordinary skills in the art should understand the specific meanings in the present invention according to specific situations.

In the description of the present invention, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A lower internals of a nuclear reactor, comprising:
   a lower core support plate defining a coolant hole therethrough;
   a flow distribution device mounted on the lower core support plate and comprising a distribution annular plate and a distribution bottom plate disposed at a lower end of the distribution annular plate, the distribution annular plate and the distribution bottom plate each having at least one distribution hole therethrough;
   a vortex suppression plate disposed below the distribution bottom plate;
   a support column defining an upper end connected with the lower core support plate and a lower end passing through the distribution bottom plate to connect with the vortex suppression plate;
an energy absorption device defining an upper end connected with the vortex suppression plate and a lower end; and
an anti-break bottom plate disposed on the lower end of the energy absorption device,
wherein a reinforcing column is disposed on an upper surface of the distribution bottom plate, surrounded by the distribution annular plate and having an upper end surface flush with an upper end surface of the distribution annular plate,
wherein a first threaded hole is formed in the lower core support plate and an axial through hole is formed within the reinforcing column, and the reinforcing column is fastened on the lower core support plate by a first threaded connection piece passing through the axial through hole and threadedly fitted in the first threaded hole.

2. The internals according to claim 1, wherein the distribution annular plate is connected with a bottom surface of the lower core support plate and an upper end surface of the distribution annular plate is contacted with the bottom surface of the lower core support plate.

3. The lower internals according to claim 2, wherein the axial through hole comprises an upper hole segment and a lower hole segment having a radial dimension larger than that of the upper hole segment, and wherein the first threaded connection piece is a bolt and a head of the bolt is accommodated in the lower hole segment.

4. The lower internals according to claim 2, wherein a plurality of reinforcing columns are provided and evenly distributed in a same circumference centered on a center of the distribution bottom plate,
wherein the reinforcing column and the distribution bottom plate are formed integrally, and the reinforcing column comprises a lower column segment having a circular cross-section and an upper column segment having a cross-shaped cross-section.

5. The lower internals according to claim 1, wherein a second threaded hole is formed in the lower core support plate, and a plurality of protrusions are formed on an inner surface of the distribution annular plate integrally and distributed uniformly in a circumferential direction of the distribution annular plate,
wherein an upper surface of the protrusion is in flush with the upper end surface of the distribution annular plate,
wherein a connection through hole is formed in each protrusion, and each protrusion is fastened to the lower core support plate by a second threaded connection piece passing through the connection through hole and threadedly fitted in the second threaded hole.

6. The lower internals according to claim 5, wherein the connection through hole comprises an upper hole segment and a lower hole segment having a radial dimension larger than that of the upper hole segment, and wherein the second threaded connection piece is a bolt and a head of the bolt is accommodated in the lower hole segment, wherein a radial dimension of the distribution annular plate is increased gradually in a direction from the lower end of the distribution annular plate to an upper end of the distribution annular plate.

7. The lower internals according to claim 1, wherein the distribution annular plate and the distribution bottom plate are formed integrally,
wherein the upper end surface of the distribution annular plate is welded with the bottom surface of the lower core support plate.

8. The lower internals according to claim 1, wherein the distribution bottom plate is circular and the distribution annular plate is positioned coaxially along a circumference of the distribution bottom plate, wherein the distribution annular plate has a plurality of distribution holes distributed symmetrically with respect to a center of the distribution annular plate and the distribution bottom plate has a plurality of distribution holes distributed symmetrically with respect to a center of the distribution bottom plate, and wherein a diameter of the distribution holes in the distribution annular plate is smaller than a diameter of the distribution holes in the distribution bottom plate.

9. The lower internals according to any one of claim 8, wherein a plurality of coolant holes are provided in the lower core support plate, the coolant holes corresponding to the plurality of distribution holes in the distribution bottom plate, and wherein a through hole is formed in the distribution bottom plate, and the upper end of the support column is passed through the through hole in the distribution bottom plate to connect with the lower core support plate, with an annular gap is defined between the support column and an inner surface of the through hole.

10. A nuclear reactor lower internals flow distribution device, comprising a distribution annular plate and a distribution bottom plate disposed at a lower end of the distribution annular plate, each of the distribution annular plate and the distribution bottom plate having at least one distribution hole,
wherein a reinforcing column is disposed on an upper surface of the distribution bottom plate, surrounded by the distribution annular plate and defining an upper end surface flush with an upper end surface of the distribution annular plate,
wherein an axial through hole is formed within the reinforcing column, and the axial through hole comprises an upper hole segment and a lower hole segment having a radial dimension larger than that of the upper hole segment.

11. The flow distribution device according to claim 10,
wherein a plurality of reinforcing columns are provided and distributed in a same circumference centered on a center of the distribution bottom plate,
wherein the reinforcing column and the distribution bottom plate are formed integrally, and the reinforcing column comprises a lower column segment having a circular cross-section and an upper column segment having a cross-shaped cross-section.

12. The flow distribution device according to claim 10, wherein a plurality of protrusions are integrally formed on an inner surface of the distribution annular plate and distributed uniformly in a circumferential direction of the distribution annular plate,
wherein an upper surface of the protrusion is flush with the upper end surface of the distribution annular plate,
wherein a connection through hole is formed in each protrusion, and each connection through hole comprises an upper hole segment and a lower hole segment having a radial dimension larger than that of the upper hole segment,
wherein a radial dimension of the distribution annular plate is increased gradually in a direction from the lower end of the distribution annular plate to an upper end of the distribution annular plate, wherein the distribution annular plate and the distribution bottom plate are formed integrally by forging or welding, and wherein a diameter of the at least one distribution hole in the distribution annular plate is smaller than that of the at least one distribution hole in the distribution bottom plate.

13. The flow distribution device according to claim 10, wherein the distribution bottom plate is circular and the distribution annular plate is positioned coaxially along a circumference of the distribution bottom plate, wherein the distribution annular plate has a plurality of distribution holes distributed symmetrically with respect to a center of the distribution annular plate and the distribution bottom plate has a plurality of distribution holes distributed symmetrically with respect to a center of the distribution bottom plate.

14. A nuclear reactor, comprising:
a pressure vessel; and
a lower internals disposed in the pressure vessel and including:
 a lower core support plate defining a coolant hole therethrough;
 a flow distribution device mounted on the lower core support plate and comprising a distribution annular plate and a distribution bottom plate disposed at a lower end of the distribution annular plate, the distribution annular plate and the distribution bottom plate defining each having at least one distribution hole therethrough;
 a vortex suppression plate disposed below the distribution bottom plate;
 a support column defining an upper end connected with the lower core support plate and a lower end passing through the distribution bottom plate to connect with the vortex suppression plate;
 an energy absorption device defining an upper end connected with the vortex suppression plate and a lower end; and
 an anti-break bottom plate disposed on the lower end of the energy absorption device,
 wherein a reinforcing column is disposed on an upper surface of the distribution bottom plate, surrounded by the distribution annular plate and having an upper end surface flush with an upper end surface of the distribution annular plate,
 wherein a first threaded hole is formed in the lower core support plate and an axial through hole is formed within the reinforcing column, and the reinforcing column is fastened on the lower core support plate by a first threaded connection piece passing through the axial through hole and threadedly fitted in the first threaded hole, and
 wherein an annular flow channel is defined between the distribution annular plate and an inner surface of the pressure vessel.

15. The nuclear reactor according to claim 14, wherein the pressure vessel comprises a vessel body and a lower end cover connected with a lower end of the vessel body, and wherein the distribution annular plate is positioned in the lower end cover with a contour of an outer surface of the distribution annular plate matching a contour of an inner surface of the lower end cover.

* * * * *